United States Patent [19]

Kaufmann et al.

[11] Patent Number: 4,506,123
[45] Date of Patent: Mar. 19, 1985

[54] CONTACT DEVICE FOR HEAVY ELECTRICAL CURRENTS

[75] Inventors: Herbert Kaufmann; Jan Larsson, both of Västeråas, Sweden

[73] Assignee: ASEA Aktiebolag, Västeråas, Sweden

[21] Appl. No.: 457,475

[22] Filed: Jan. 12, 1983

[30] Foreign Application Priority Data

Jan. 15, 1982 [SE] Sweden .............................. 8200202

[51] Int. Cl.³ .............................................. H01H 35/40
[52] U.S. Cl. .................................. 200/83 J; 200/248; 200/DIG. 42
[58] Field of Search .................. 200/81 R, 81 H, 83 J, 200/83 N, DIG. 43, DIG. 42, 248, 249, 250, 251

[56] References Cited

U.S. PATENT DOCUMENTS

| | | | |
|---|---|---|---|
| 2,421,797 | 6/1947 | Malone | 200/83 J |
| 2,927,984 | 3/1960 | Turek | 200/81 R |
| 3,631,389 | 12/1971 | Elliott | 200/81.4 |
| 4,348,575 | 9/1982 | Hedren et al. | |

FOREIGN PATENT DOCUMENTS

| | | | |
|---|---|---|---|
| 1150187 | 1/1958 | France | 200/289 |
| 1182782 | 3/1970 | United Kingdom | 200/83 N |

Primary Examiner—Thomas H. Tarcza
Assistant Examiner—M. Reinhart
Attorney, Agent, or Firm—Watson, Cole, Grindle & Watson

[57] ABSTRACT

An electrical contact device for transmitting heavy currents between relatively rotatable parts, for example between a fixed welding transformer and a rotatable unit which supports a spot welding gun. The contact device comprises a spaced-apart pair of annular, axially fixed, contact segments on one unit and, between these, an axially displaceable pair of annular contact disks on another unit. The disks are urged towards each other by springs and are thereby centered by a centering device to provide a well-defined clearance between each contact disk and the confronting contact segment, and the disks are pressed outwardly against the co-acting contact segments, to eliminate said clearances when current is to flow therebetween, by an annular operating device. The contact device has particular utility in robotics and prevents wear at the contacting surfaces on the appearance of relative rotation therebetween.

7 Claims, 4 Drawing Figures

A - A

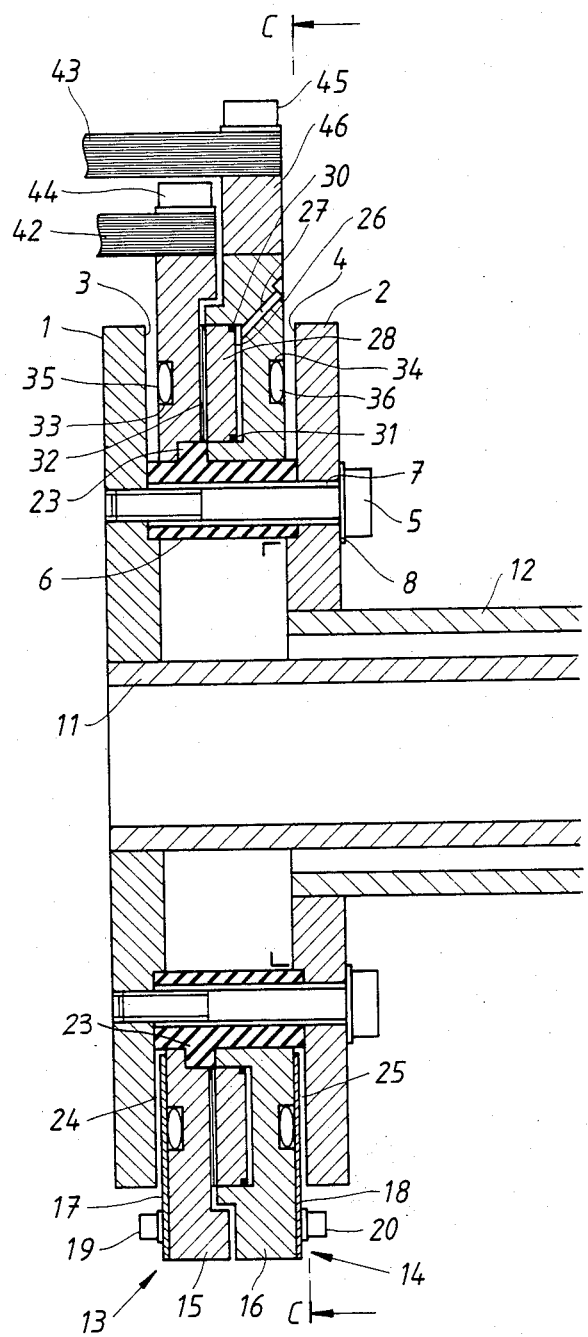
A - A   FIG. 1

CONTACT DEVICE FOR HEAVY ELECTRICAL CURRENTS

TECHNICAL FIELD

The invention relates to an electrical contact device for transmitting heavy currents, for example between a transformer and a rotatable unit supporting a spot welding gun in a piece of welding equipment. The contact device is particularly intended to transmit working currents between units in a robot which are rotatable in relation to each other.

DISCUSSION OF PRIOR ART

Contact devices are known in the art which comprise two pairs of co-acting contact segments or disks which, during adjusting movements, are held separated from each other but are brought together by an operating device prior to a welding operation and are held pressed together during the welding operation. These contact devices may be formed with two spaced-apart segments, which are axially fixed relative to each other, and two contact disks, which are axially displaceable between the noted segments, the disks being influenced in a direction towards each other by springs and away from each other, towards the co-acting axially fixed contact segments, by a number of operating devices. The contact devices used up to now have been bulky and heavy, and these are serious drawbacks when such a contact device is included in the current supply means of robot welding equipment. Further, the previously used contact devices have been unsatisfactory from the point of view of service. In case of contact damage, dismantling of the contact device has been required to replace worn contact elements.

One object of the invention is to provide a contact device with a high current-carrying capacity and a long life which is both light and compact. Another object of the invention is to provide a contact device which is easy to service and permits replacement of contact elements without having to dismantle the contact device.

SUMMARY OF THE INVENTION

A contact device according to the invention comprises two contact segments on one unit which are axially displaceable relative to each other. These contact segments are positioned between contact segments on the other unit which are axially fixed in relation to each other. An annular operating device is arranged to displace the displaceable contact segments from each other into contact with the axially fixed contact segments. Return springs influence the axially displaceable contact segments towards each other and against a centering device, which guarantees an axial clearance between the axially fixed and the axially displaceable segments. The axially fixed or the axially displaceable segments are annular, but suitably both the axially displaceable and the axially fixed contact segments are annular. A spacing element between the contact segments which are axially fixed in relation to each other is formed with a centering device for the axially displaceable contact segments.

In one preferred embodiment, one of the axially displaceable contact segments is formed with an annular cylinder. In it a ring piston is slidably disposed which acts against the other axially displaceable contact segment. In another preferred embodiment, one of the axially displaceable contact segments is formed with an annular diaphragm which, under the influence of a pressure medium, directly, or via a force-transmitting element, acts against the second axially displaceable contact segment. The contact segments may consist of a supporting part of one material, for example aluminum, and a contact part of another material, for example a copper alloy or a silver alloy. Different contact materials may be used on the co-acting contact segments. One of two co-acting contact segments may advantageously be provided with replaceable contact elements which are attached by means of fixing devices which are accessible in such a way that the contact elements can be detached and be replaced with new ones without dismantling of the contact device.

BRIEF DESCRIPTION OF DRAWINGS

Two embodiments of contact device in accordance with the invention will now be described in greater detail, by way of example, with reference to the accompanying drawings, in which:

FIG. 1 is a radial section through a first embodiment of contact device taken on the lines A—A in FIG. 3;

DESCRIPTION OF PREFERRED EMBODIMENTS

Figures 2, 3, 4:
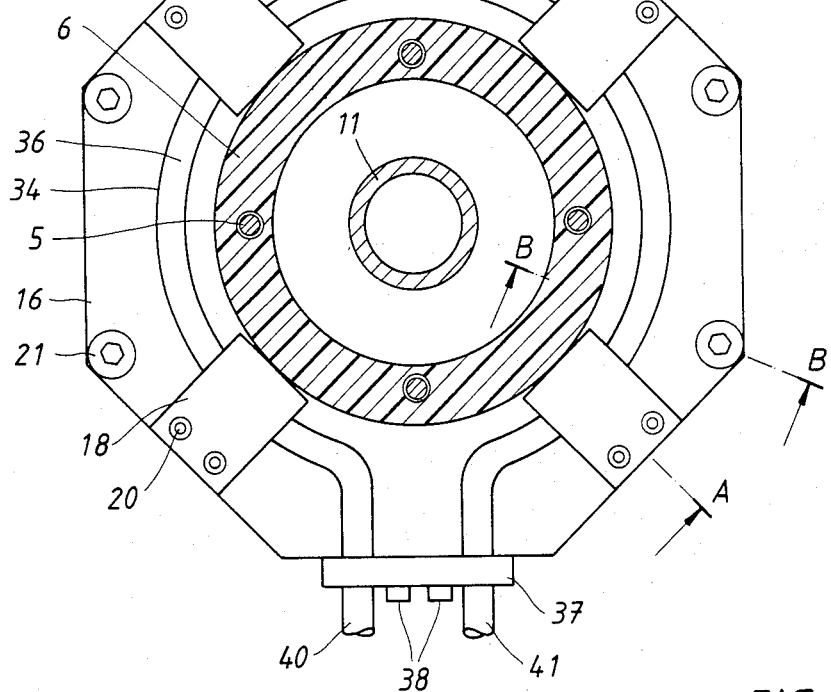
FIG. 2 is a partial radial section taken on the line B—B in FIG. 3.
FIG. 3 is a transverse section taken on the lines C—C in FIG. 1.
FIG. 4 is a partial section (similar to FIG. 2) through a second embodiment of contact device with a diaphragm as the operating device.

In the drawings, numerals 1 and 2 designate annular contact segments, axially fixed relative to each other, with confronting annular contact surfaces 3 and 4, respectively. The segments 1 and 2 may be made entirely of a material having good electrical contact properties (e.g. a copper alloy) or they may be made with a supporting part of a material selected for its mechanical properties and with a contact part of a different material having good contact properties. In this second case, the supporting part may be made of aluminum and the contact part of a copper or silver alloy.

The segments 1 and 2 are held together by a number of bolts 5 and are pressed against an annular spacing element 6, which is suitably made entirely of an electrically-insulating material. In any event, the segments 1 and 2 must be electrically insulated from each other. Between the bolts 5 and the segment 2 are located sleeves 7 and washers 8, both of electrically-insulating material. The segments 1 and 2 are connected together by coaxial tubular conductors 11 and 12, respectively. Between the segments 1 and 2, co-acting axially displaceable annular contact disks 13 and 14 are arranged. These comprise a supporting part 15 and 16, respectively, and a number (in the illustrated case, four) spaced-apart rectangular, disk-shaped contact plates 17 and 18, respectively, of, for example, a good contact material such as silver alloy. The plates 17, 18 are fixed to the supporting parts 15 and 16, respectively, by screws 19 and 20, respectively, which screws are positioned so as to be accessible for easy removal whereby the contact plates 17 and 18 can be withdrawn axially or tangentially and replaced without the contact device having to be dismantled.

As shown in FIG. 2, the contact disks 13, 14 are held together by bolts 21 and springs 22, which urge the disks 13 and 14 in directions towards each other and against a centering flange 23 on the spacing element 6. This flange 23 ensures the creation of clearances 24 and 25, respectively, between the contact plates 17 and 18 and the surrounding contact segments 1 and 2. The supporting part 16 of the disk 14 is formed with an annular cylindrical channel 26. This cylinder is connected, through a flow channel 27, to a pressure medium source (not shown). In the channel 26, an annular piston 28 with sealing rings 30 and 31 is slidably disposed. Between the piston 28 and the supporting part 15 of the contact disk 13, there is located a ring 32 of thin electrically-insulating material. In the supporting parts 15 and 16 there are grooves 33 and 34, respectively, in which cooling tubes 35 and 36, respectively, of cooper are arranged. These cooling tubes are connected to connection devices 37, which are fixed to the supporting parts 15 and 16, respectively, by bolts 38. Through conduits 40 and 41, cooling water is supplied and discharged. The contact disks 13 and 14 are connected to the terminals of a current source (not shown) via blade conductors 42 and 43, respectively, by bolts 44 and 45, respectively, and, in the case of the disk 14, also via an electrically-conducting spacer 46.

From the above it will be appreciated that, when the cylinder 26 is pressurized, the disk 13 electrically connects the tubular conductor 11 to the blade conductor 42 via the contact plates 17, and the disk 14 electrically connects the tubular conductor 12 to the blade conductor 43 via the contact plates 18. The force with which the contact plates 17 and 18 are pressed against the segments 1 and 2 can easily be made sufficient to carry the heavy current required for spot welding. When the pressure in the channel 26 is let down, the disks 13, 14 move together, under the influence of the springs 22, to reestablish the clearances 24 and 25 and allow the segments 1, 2 to rotate relative to the disks 13, 14 without any possibility of wear of the plates 17 and 18.

FIG. 4 shows part of a second embodiment of contact device which uses a modified disk 14. In an annular groove 50 in the supporting part 16 of the modified disk 14, there is located an annular, flexible, electrically insulating diaphragm 51 which is retained in the groove 50 by means of a diaphragm retainer 52 and a number of screws 53. The diaphragm retainer 52 has a number of holes 54 which permit pressure medium to pass through the diaphragm retainer 52 and force the diaphragm 51 away from the retainer 52 so that the contact disks 13 and 14 separate. In this way each contact disk 13 and 14 is brought into electrical contact with the respective contact segment 1 or 2.

The specific embodiments described may be changed in many ways within the scope of the following claims.

What is claimed is:

1. In an electrical contact device for intermittent transmission of heavy electrical currents between two units which are rotatable relative to one another, comprising
    a spaced apart pair of annular contact segments on one unit which are axially fixed relative to each other,
    a pair of annular contact segments on the other unit which are axially displaceable relative to each other, and
    operating means for axial displacement of the displaceable contact segments towards the axially fixed contact segments,
    the improvement wherein
    one of said pair of axially displaceable contact segments includes a cylindrical channel,
    the operating means includes a ring piston slidingly movable within said cylindrical channel to displace the axially displaceable contact segments away from each other and towards the axially fixed contact segments,
    a centering device is provided for said axially displaceable contact segments which ensures a clearance between each axially fixed contact segment and its adjacent axially displaceable segment when the latter pair of segments contact said centering device, and
    spring means is provided to urge the axially displaceable contact segments towards each other and towards said centering device.

2. A contact device according to claim 1, wherein a spacer is disposed between the axially fixed contact segments which includes a centering flange, said centering flange comprising said centering device.

3. A contact device according to claim 1, in which each of the pairs of contact segments are annular and one of the axially displaceable contact segments includes an annular diaphragm and fluid passage means for the supply of a pressure medium to the diaphragm to urge the latter towards the other axially displaceable contact segment.

4. A contact device according to claim 1, wherein each of the contact segments of at least one of the two pairs of contact segments consists of a supporting part of a first material and at least one contact part of electrically-conducting contact material.

5. A contact device according to claim 4, wherein the electrically-conducting contact material consists of a silver alloy.

6. In an electrical contact device for intermittent transmission of heavy electrical currents between two units which are rotatable relative to one another, comprising
    a spaced-apart pair of annular contact segments on one unit which are axially fixed relative to one another,
    a pair of annular contact segments on the other unit which are axially displaceable relative to each other, and
    operating means for axial displacement of the displaceable contact segments towards the axially fixed contact segments,
    the improvement wherein
    the operating means includes an annular diaphragm in one of the axially displaceable contact segments and a fluid passage means in said one of the axially displaceable contact segments for the supply of a pressure medium to the diaphragm to urge it towards the other axially displaceable contact segment and thus move said axially displaceable contact segments away from each other and towards the axially fixed contact segments,
    a centering device is provided for said axially displaceable contact segments which ensures a clearance between each axially fixed contact segment and its adjacent axially displaceable segment when the latter pair of segments contact said centering device, and
    spring means is provided to urge the axially displaceable contact segments towards each other and towards said centering device.

7. In an electrical contact device for intermittent transmission of heavy electrical currents between two units which are rotatable relative to one another, comprising
- a spaced-apart pair of annular contact segments on one unit which are axially fixed relative to one another,
- a pair of annular contact segments on the other unit which are axially displaceable relative to each other, and
- operating means for axial displacement of the displaceable contact segments towards the axially fixed contact segments, the improvement wherein the operating means is formed as an annular operating device arranged to displace the axially displaceable contact segments away from each other and towards the axially fixed contact segments, each of the contact segments of one of said pairs of contact segments is provided with a replaceeable contact element which is radially or tangentially insertable between it and the adjacent contact segment and is fixable in place by fixing members which are removable without having to dismantle the contact device, a centering device is provided for said axially displaceable contact segments which ensures a clearance between each axially fixed contact segment and its adjacent axially displaceable segment when the latter pair of segments contact said centering device, and spring means is provided to urge the axially displaceable contact segments towards each other and towards said centering device.

* * * * *